No. 809,636. PATENTED JAN. 9, 1906.
F. B. SHUSTER.
WIRE STRAIGHTENING AND CUTTING-OFF MACHINE.
APPLICATION FILED NOV. 24, 1903.
5 SHEETS—SHEET 3.
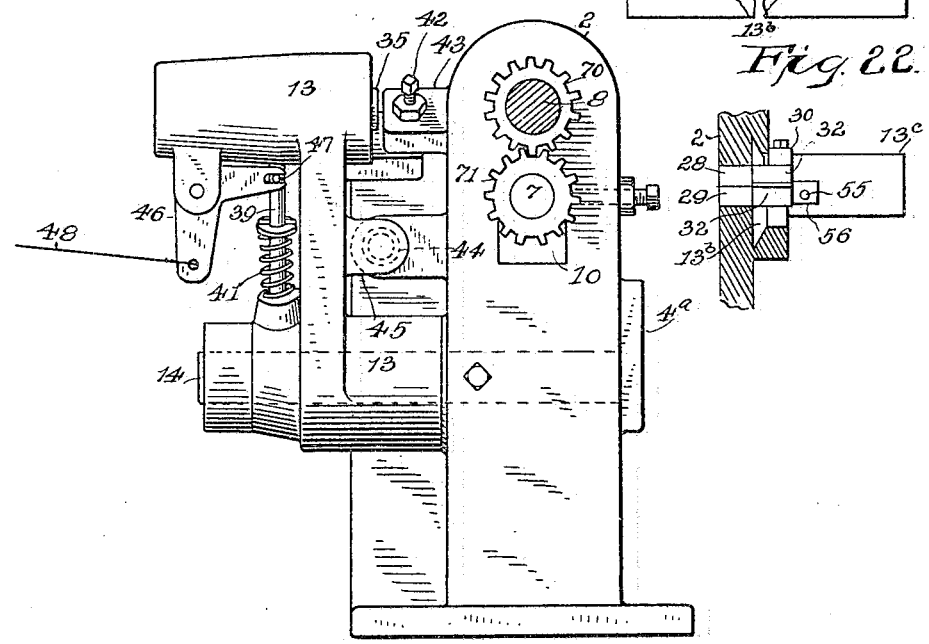
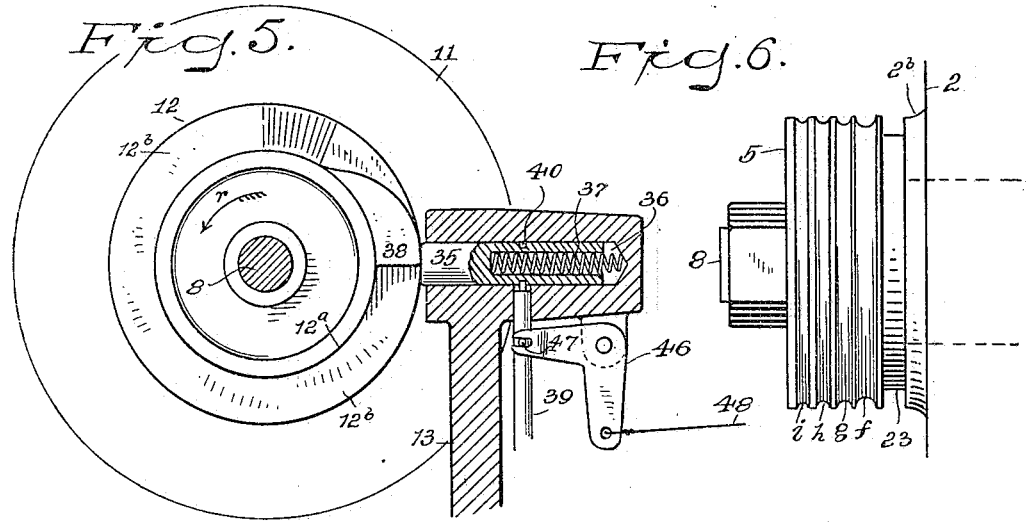
WITNESSES:
H. A. Lamb
G. W. Finn
INVENTOR
Franklin B. Shuster.
BY Geo. D. Phillips
his ATTORNEY No. 809,636. PATENTED JAN. 9, 1906.
F. B. SHUSTER.
WIRE STRAIGHTENING AND CUTTING-OFF MACHINE.
APPLICATION FILED NOV. 24, 1903.
5 SHEETS—SHEET 4.
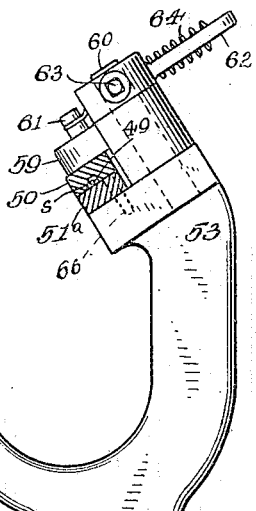
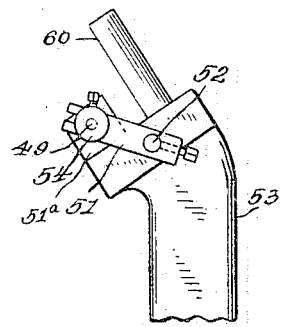
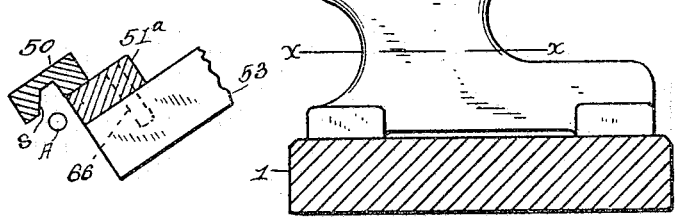
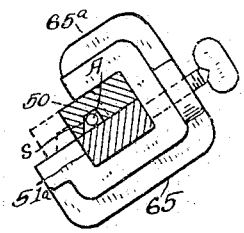
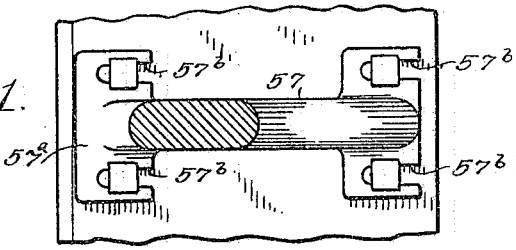
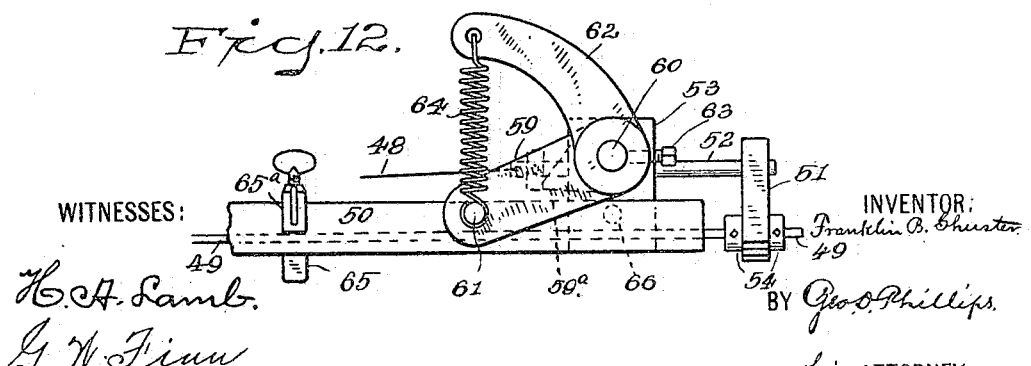
WITNESSES:
H. A. Lamb.
G. W. Finn
INVENTOR:
Franklin B. Shuster
BY Geo. O. Phillips.
his ATTORNEY No. 809,636. PATENTED JAN. 9, 1906.
F. B. SHUSTER.
WIRE STRAIGHTENING AND CUTTING-OFF MACHINE.
APPLICATION FILED NOV. 24, 1903.

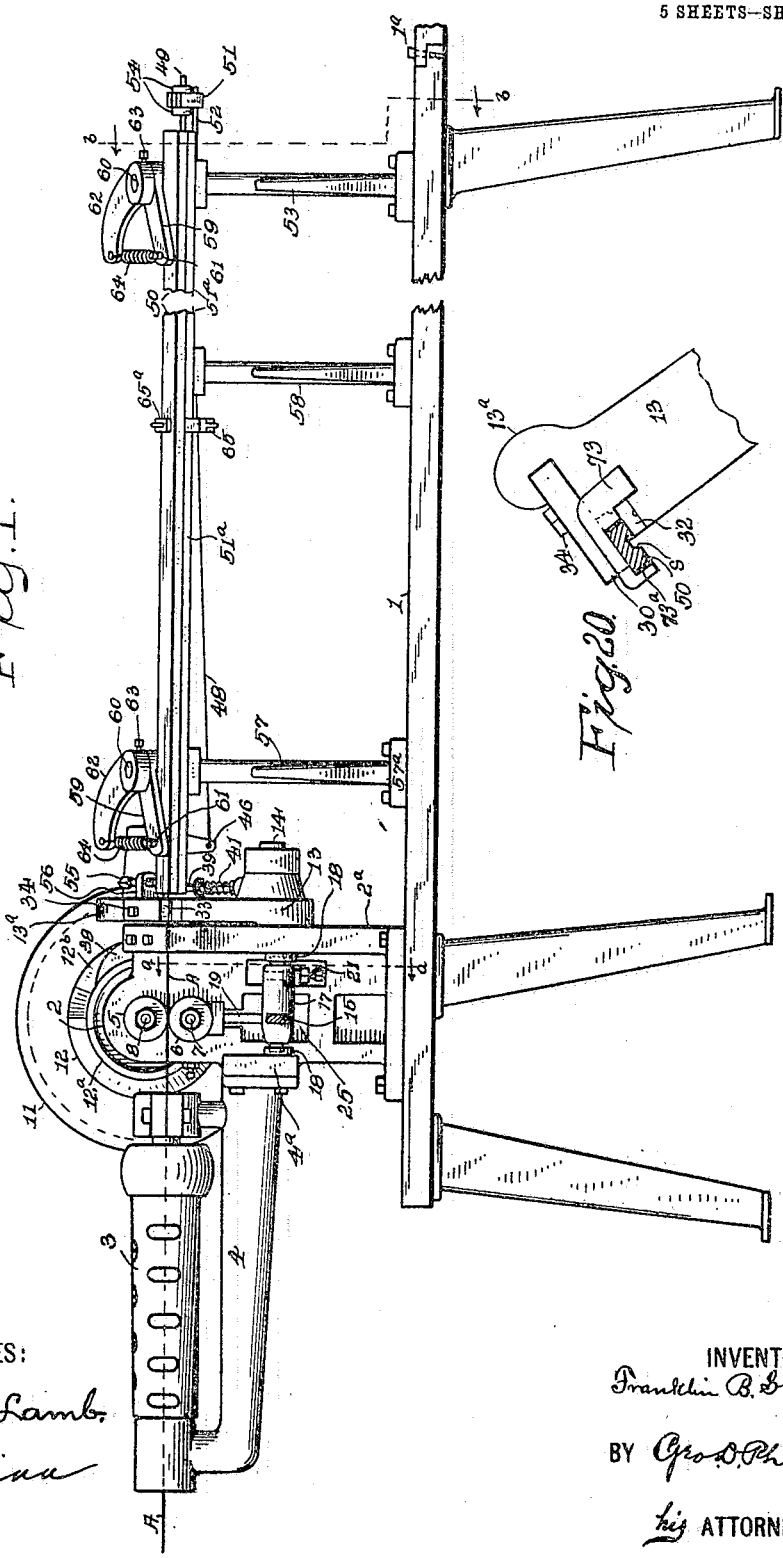

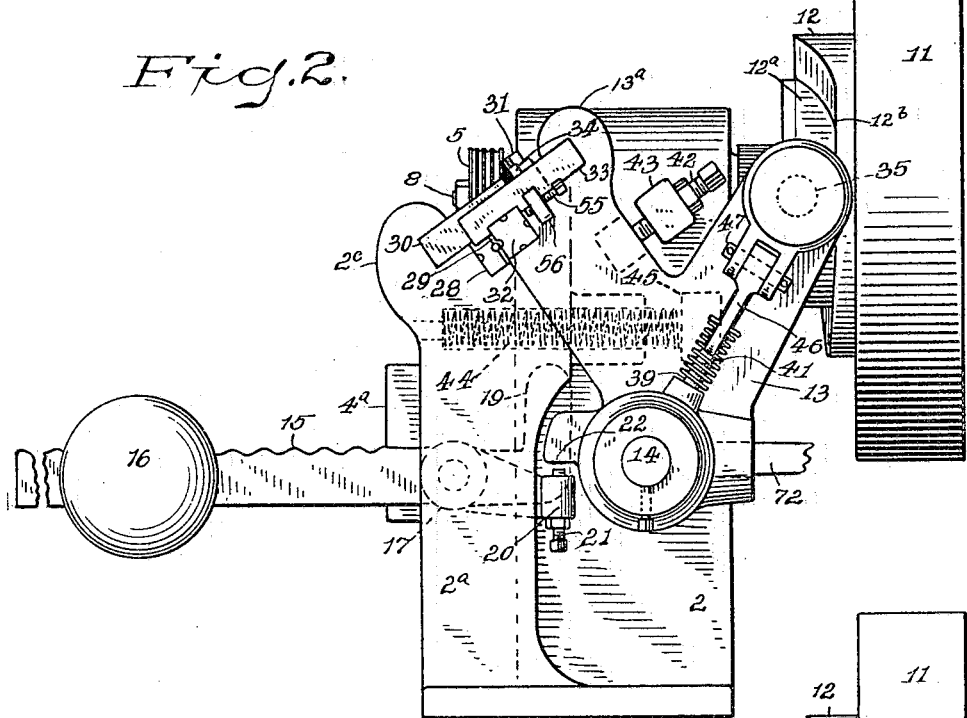

5 SHEETS—SHEET 5.

WITNESSES:
H. A. Lamb.
G. W. Finn

INVENTOR:
Franklin B. Shuster.
BY Geo. D. Phillips.
his ATTORNEY.

UNITED STATES PATENT OFFICE.

FRANKLIN B. SHUSTER, OF NEW HAVEN, CONNECTICUT.

WIRE STRAIGHTENING AND CUTTING-OFF MACHINE.

No. 809,636.         Specification of Letters Patent.         Patented Jan. 9, 1906.

Application filed November 24, 1903. Serial No. 182,546.

*To all whom it may concern:*

Be it known that I, FRANKLIN B. SHUSTER, a citizen of the United States, and a resident of New Haven, in the county of New Haven and State of Connecticut, have invented certain new and useful Improvements in Wire Straightening and Cutting-Off Machines, of which the following is a specification.

My invention relates to wire straightening and cutting-off machines.

The object of my invention is to construct a machine of this character that will combine efficiency, simplicity, durability, and cheapness; that can be easily assembled and taken apart and packed for shipment so as to occupy but little space as compared with the present machines now in use, and, further, that the machine can be extended or added to, so as to cut lengths of wire beyond the capacity of the ordinary compact machines; further, the head carrying the wire-straightener and cutter-holder can readily be detached from the bed or table and used exclusive of the guide-bar.

To enable others to understand my invention, reference is had to the accompanying drawings, in which—

Figure 13:
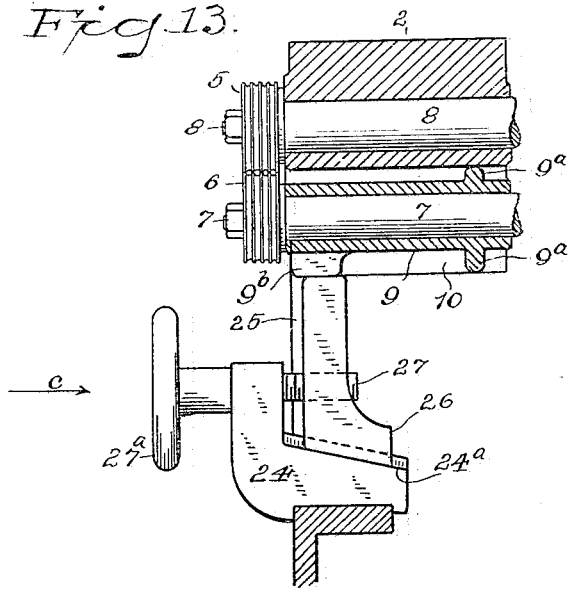
Figure 14:
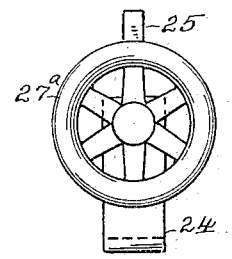
Figure 15:
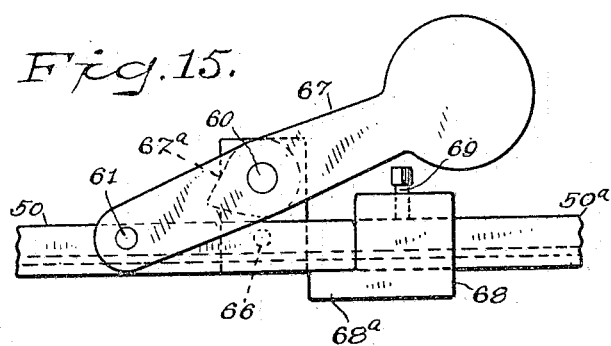
Figure 16:
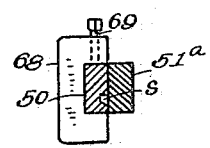
Figure 17:
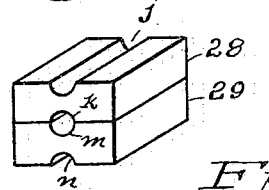
Figure 18:
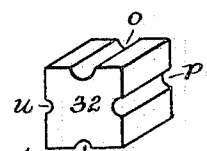
Figure 19:
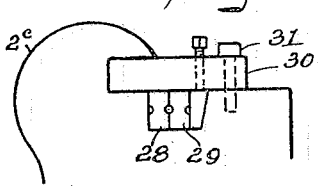

Figure 1 represents a front side elevation broken view of the table guide-bar, and its supporting-bar, and sectional view of the weighted lever-beam that actuates the lower feed-roll box, also broken view of the table extension. Fig. 2 is a front end elevation of the machine-head and broken view of the weighted lever-beam. Fig. 3 is a sectional elevation of the machine-head through line *a a* of Fig. 1 with the cutter-holder removed. Fig. 4 is a detached side elevation sectional view of the driving-shaft and broken view of the trip-wire. Fig. 5 is a broken sectional view of the cutter-holder, broken sectional view of a spring-pin adapted to be engaged by the cam, a side elevation of which is shown mounted on a sectional view of the driving-shaft, broken view of the locking-bolt for the spring-pin, bell-crank lever for actuating the locking-bolt, and broken view of the trip-wire attached to the bell-crank lever. Fig. 6 is a side elevation of one of the wire-feed rolls and broken view of the machine-head. Fig. 7 is a sectional view of the table through line *b b* of Fig. 1, side elevation of one of the wire brackets, sectional view of the guide-bar for the wire and its supporting-bar. Fig. 8 is a broken side elevation of the wire-receiving bracket shown at Fig. 7 with the guide-bar-actuating mechanism removed, also rear view of the stop-rod and the wire guide-bar and its supporting-bar. Fig. 9 is a broken view of the upper end of one of the wire-receiving brackets, sectional view of the guide-bar in a forward position with respect to its supporting-bar to discharge a section of wire therefrom. Fig. 10 is a detail sectional view of the guide-bar in its rear position to receive the wire and sectional view of the guide-bar and its supporting-bar clamp attached to the supporting-bar and overhanging the guide-bar to prevent its lifting in its lateral movements on its supporting-bar. Fig. 11 is a broken upper plan view of the table and plan view, on section-line *x x* of Fig. 7, of one of the wire-brackets, showing the manner of attaching it to the table. Fig. 12 is a broken upper plan view of the guide-bar, broken view of the stop-rod and trip-wire, upper plan view of one of the devices for effecting a parallel movement of the guide-bar on its support. Fig. 13 is a broken sectional view of the machine-head, broken side elevation of the wire-feed rolls, side elevation of an adjusting device for positively setting the lower feed-roll with respect to the upper one. Fig. 14 is a detail front elevation of the lower feed-roll-adjusting device looking in the direction of arrow *c* of Fig. 13. Fig. 15 is a broken plan view of the wire-guide bar and an extension of the same, modification of the device shown at Fig. 12 for effecting a parallel movement of the guide-bar. Fig. 16 is a detail sectional view of the guide-bar extension and its supporting-bar and carrier for said guide-bar. Fig. 17 is a detail perspective view of the reversible wire-cutting dies. Fig. 18 is a detail perspective view of the reversible wire-cutter. Fig. 19 is a broken view of the machine-head, showing the cutting-dies in place. Fig. 20 is a broken view of the cutter-holder, showing a modified construction whereby it actuates the guide-bar. Fig. 21 is a reduced broken detail view of a modified construction of the cutter-holder adapted to slide on the machine-head. Fig. 22 is a broken sectional view of the machine-head and a front elevation of the modified cutter-holder shown at Fig. 21 operatively mounted therein.

Its construction and operation are as follows:

1 represents the bed or table, which in most cases and as a matter of economy consists of a wooden plank.

2 is the machine-head, 3 an ordinary rotary wire-straightener head, and 4 its frame, bolted to the spotting-piece 4 of the machine-head.

5 and 6 are the wire-feed rolls. (Seen more clearly at Figs. 1, 3, and 13.) 7 and 8 are their shafts. (See also Fig. 4.) The lower shaft 7 is journaled in the tilting box 9. This box, Fig. 13, has the upper and lower fulcrum-points $9^a$ located at the rear of said box and engaging the upper and lower walls of the square hole 10 of the head 2. The upper shaft 8 is the driving-shaft and carries at its outer end the combined balance and driving pulley 11. This pulley carries the cam 12, adapted to actuate the cutter-holder 13, pivotally supported on the stud 14 projecting from the head 2, presently to be more fully described. When the wire A is being fed forward, the feed-rolls are in close relation with each other, as shown at Figs. 1, 3, and 13, and are held there until the wire is severed, as follows: 15, Figs, 1, 2, and 3, is a lever carrying the movable weights 16. 17 is the head portion of this lever, which is journaled in the U-shaped bearings 18, projecting from the inner face of the spotting-piece $4^a$ and the inner face of the flange $2^a$ of the head 2. Integral with the head portion of this weighted lever and projecting upward therefrom is the toe 19, adapted to engage the projection $9^b$ of the box 9, and shown dotted at Fig. 3. 20 is a short arm projecting from the head of this weighted lever, and it carries at its free end the adjusting-screw 21, adapted to be engaged by the short arm 22, Fig. 2, of the cutter-holder 13, so that when said holder is thrown back and out of cutting position the weighted lever will keep the lower feed-roll 6 up against the wire to feed it forward; but in the forward movement of this cutter-holder when severing the wire the arm 22 will strike the adjusting-screw 21 and tilt the weighted lever and also permit the box 9 to tilt and carry the lower feed-roll down and out of contact with the wire, and thus arrest the further feeding of the wire until the cutter-holder has retreated sufficient to permit the feeding of the wire. The feed-rolls have each four grooves, adapted to feed wire of different sizes by simply changing their position, as follows: The inner groove $f$ (see Fig. 6) is supposed to be in action or on the feeding-line of the wire. If the groove $g$ is required, the collar 23, which collar may be the width of one of the grooves, is removed and placed in front of the roll, which will bring said roll up against the shoulder $2^b$ of the machine-head. If the groove $i$ is required, the collar 23 is replaced against said shoulder and the roll reversed. The groove $h$ can be utilized by removing said collar from its inner position and the roll brought against the shoulder $2^b$, as before mentioned. This construction of the rolls, whereby several different sizes of grooves are combined in one roll, is of great advantage in that there is only one roll required, while in ordinary cases a separate roll is required for different sizes, which often results in these rolls being misplaced when most wanted. It will be understood, however, that a multiple-grooved roll can be used when all of the grooves are of the same size, so that when one groove is worn out another groove can be brought into position.

The automatic arrangement for temporarily arresting the feeding of the wire by dropping the lower feed-roll is especially adapted for wire of small diameter. Where large wire is used, the device shown at Fig. 13 is employed. 24 is a bracket seated on the lower edge of the square opening 25 of the machine-head, (see also Fig. 1,) having the inclined face $24^a$. 26 is a movable block having a tapered foot adapted to slide on the inclined face of said bracket, while its upper end engages the lug $9^b$ of the box 9. 27 is an adjusting-screw engaging a threaded hole in said block, whereby said block is moved in and out by means of the handle $27^a$ of said adjusting-screw. In this construction the box 9 would be manually operated to raise and lower said box.

The reversible wire-cutting dies (shown at Fig. 17) comprise the two sections 28 and 29, having the grooves $j\ k\ m\ n$, and are inserted in an opening in the upper part of the flange portion $2^a$ of the head 2. (Seen more clearly at Fig. 2.) 30 is a cap adapted to hold these dies in place in the following novel and economical manner, viz: $2^c$ is an enlarged portion of the flange $2^a$ and is provided with an undercut to receive one end of the cap 30, while the opposite end of the cap is secured by the screw 31.

The cutter-holder 13 oscillates, as before mentioned, on the stud 14, projecting from the head 2.

32, Fig. 18, is a solid cutter with four sides, and in each are the grooves $o\ p\ q\ u$, which grooves may correspond in size to the four grooves of the cutting-dies 28 and 29. This solid cutter is secured at the upper corner of the holder 13, as shown at Fig. 2, and is secured in place by the cap 33 and screw 34. This cap, like the cap 30 of the cutting-dies, has one end inserted in an undercut of the enlarged portion $13^a$ of the said cutting-off lever. Making the wire-cutter square and solid with wire-grooves in each face is a decided improvement over the present method of making cutters for machines of this character, as they can readily be reversed for different sizes of wire, or the grooves may be of equal size, and then it has the advantage of being compact. The greatest advantage of this solid construction is the ease with which the cutter can be sharpened, as all that is necessary is to grind the ends until the corners or edges of the grooves are sharp, and when one end is dull the cutter can be reversed without loss of time.

The cutter-holder carries the spring-actuated driver comprising (see Figs. 4 and 5) the pin 35, reciprocally operating in the hole 36 and backed up by the spring 37. This pin operates in conjunction with the cam 12 to throw the cutter-holder forward to cut off a section of wire, as follows: This cam is shown as integral with the driving-wheel 11, although it can be separate. The cam rotates in the direction of arrow $r$, Fig. 5, and when the projection 38 of the cam has reached the pin 35 it will force it back and lock it in this position by means of the locking-bolt 39, having a reduced upper portion adapted to be forced into the circumferential groove 40 of the driving-pin by the spring 41. When said pin is thus locked, the cutter-holder is in its extreme rear position against the adjusting-screw 42, Fig. 2, mounted in the lug 43 of the machine-head and is held back by the spring 44, which spring has one end located in the head 2 and the other bearing against the lug 45 shown at Figs. 2 and 4.

46, Figs. 1, 2, 4, and 5, is a bell-crank lever pivotally supported on the cutter-holder and having a groove in its horizontal arm to embrace the pin 47 of the locking-bolt 39. 48 is a trip-wire attached by one end to the vertical arm of this bell-crank lever, and the other end is connected to the stop-rod mechanism located at the rear of the machine, as shown at Figs. 8 and 12.

49 is the stop-rod, which extends into the longitudinal wire-groove $s$, located in the lower face of the guide-bar 50, as shown at Fig. 7.

51 is an arm secured to the short shaft 52, Fig. 12, which shaft is adapted to have a longitudinal movement in the upper end of the rear wire-bracket 53. The opposite end of this arm is forked to straddle the stop-rod, Fig. 8, and 54, Fig. 12, represents adjustable collars on said rod with the free end of the arm 51 between them.

The trip-wire 48 is attached to the end of the movable shaft 52, so that when the wire has been fed into the groove of the guide-bar until its forward end touches the stop-rod 49 said rod is pushed back and carries with it the movable shaft 52, which action will exert a pull on the trip-wire to actuate the bell-crank lever and draw down the locking-bolt 39 and release the driving-pin 35, which pin will be thrown forward by its spring against the flanged portion 12$^a$ of the cam 12, which flange acts as a stop to prevent the pin from being entirely ejected from the cutter-holder. When the driving-pin is in this position, its cylindrical surface will be in contact with the cam-surface 12$^b$. (Shown at Figs. 1, 2, 3, and 5.) This engagement will throw the cutter-holder forward to sever the wire and at the same time compress and store up sufficient tension in the spring 44 to carry the lever back, so that when the projection 38 of the cam has reached the position shown at Fig. 5, as before mentioned, the driving-pin will be forced back and locked in readiness to be again projected forward through the movement of the trip-wire.

The guide-bar 50 is adapted to have a lateral movement on its supporting-bar 51$^a$ through the medium of the screw 55, Figs. 1 and 2, adjustably mounted in the lug 56, projecting from the cutter-holder 13. When the forward end of the wire strikes the inner end of the stop-rod to release the driving-pin carried by the said holder, and this holder is impelled forward and severs a length of wire, the point of the adjusting-screw 55 will strike the rear face of the guide-bar and move it laterally on its supporting-bar, Fig. 9, until the wire-groove $s$ therein has been uncovered sufficient to let the severed wire-section drop into the wire-receiving brackets 53, 57, and 58, Fig. 1. The guide-bar is operatively supported on its supporting-bar as follows: 59, Figs. 1, 7, and 12, represents links pivotally supported on the studs 60, projecting from the upper surface of the wire-receiving brackets 53 and 57. The other ends of these links are pivotally supported on the studs 61, projecting from the upper surface of the guide-bar 50. 62 represents arms adjustably secured to the studs 60 by the set-screws 63, and 64 represents springs connecting the free ends of these arms with the studs 61. These springs serve to bring the guide-bar back to its normal position after it has discharged the wire, and the links 59 serve to keep the guide-bar parallel with its supporting-bar, and the tension of the springs is increased or decreased by simply changing the position of the arms 62 on their supports.

65, Figs. 1, 10, and 12, is a clamp adjustably secured to the supporting-bar 51$^a$ and is adapted to prevent the guide-bar lifting from the supporting-bar by means of the overhanging lip 65$^a$. This clamp is always located just back of the forward end of the stop-rod 49, Fig. 12, so as not to interfere with the free discharge of the wire-section from the guide-bar. As the guide-bar is held on the supporting-bar by the arms 62, it would drop therefrom the instant these arms were removed. To prevent this, the under side of the links 59, Fig. 12, are furnished with the projections 59$^a$, which projections will strike against the supporting-bar 51$^a$ and arrest the further movement of said levers. This feature is very important, especially when the machine is being taken apart for shipment. The supporting-bar is provided with holes adapted to receive the short studs 66, Figs. 7, 9, 12, and 15, from which they are easily removed when the machine is taken down.

In Fig. 15 is shown a modification of the construction relating to the parallel movement of the guide-bar on its support. In this construction the weighted lever 67 is used to take the place of the links 59, arms 62, and the springs 64, previously described. This lever is pivotally supported on the studs 60 of the wire-receiving brackets and also on the studs 61 of the guide-bar. This weighted lever has the projection 67$^a$, which serves the purpose as the projections 59$^a$ of the links 59, before mentioned.

As the guide-bar or its mechanism is not directly attached to the machine-head, the feet 57$^a$ of the wire-receiving brackets are provided with the slots 57$^b$ in order that these brackets may readily be shifted on the table 1 to bring the wire-receiving groove of the guide-bar in line with the cutting-dies.

As before mentioned, the table 1 can be made of wood or iron and as a matter of economy wood is preferable. The head 2 is simply attached thereto and can readily be removed and used for cutting off short sections of wire. In this case any suitable means may be attached to the head to serve as a gage to cut the sections of equal length.

The table 1 can readily be extended to any desired length by simply placing the extension-table 1$^a$, Fig. 1, to the table 1, and these extensions can be multiplied indefinitely, and whenever the table is extended the guide-bar and its operating mechanism must also be extended. In other words, the guide-bar and its mechanism, together with the wire-receiving brackets, must be duplicated for every table extension that is attached. To move the second guide-bar 50$^a$, Fig. 15, in unison with the first or initial guide-bar 50, I employ the collar or clamp 68, which is secured to the end of this second guide-bar by means of the screw 69. 68$^a$ is a projection of this collar, which extends over and embraces the rear end of the guide-bar 50, so that when this latter guide-bar is laterally actuated the second guide-bar will also be carried with it. Each and every guide-bar extension that is added to the first or initial guide-bar may be equipped with either the links, arm, and spring shown at Fig. 12 or with the weighted lever shown at Fig. 15. Whenever an extension is added, the stop-rod mechanism comprising the shaft 52 and arm 51 will of course be shifted to the last one of the series of wire-receiving brackets and the stop-rod lengthened accordingly.

As the guide-bar is kept in parallel relation with its supporting-bar by means of the links 59 and the weighted lever 67, which is also a link, the bar moves both laterally and longitudinally, but principally laterally. Therefore, as the lateral movement is the essential one and the longitudinal movement is only an incidental feature of the link connection, I wish it distinctly understood that the term "lateral movement" as applied to the guide-bar also includes the swinging movement produced by the links or a strictly lateral movement whether links are used or not, as the main thing is to move the guide-bar sidewise far enough to deliver a section of wire bodily therefrom.

In place of the adjusting-screw 55 actuating the guide-bar the modification shown at Fig. 20 could be used, which consists of the overhanging projection 73 of the cutter-holder 13, having the recess 73$^a$ to receive the end of the guide-bar 50. When this construction is used, there is not as good an opportunity to adjust the position of this recess with respect to the guide-bar or said guide-bar with respect to the feeding-line of the wire as where the adjusting-screw 55 is employed. The purpose of the adjusting-screw 21 is to time the movement of the lower feed-roll with the movement forward of the cutter-holder, or, in other words, with the engagement of the cutter with the wire.

In place of pivotally supporting the cutter-holder upon the stud 14, as shown at Fig. 2, the modification shown at Figs. 21 and 22 could be used. This consists of the reciprocating slide 13$^b$, adapted to operate in guideways formed on the front face of the head 2. In this construction the driving-pin 35 is operatively mounted in the projection 13$^c$ of the said slide. A spring (not shown) can be used to return this slide back to its normal position, as described, for the pivotally-supported cutter-holder, also an adjustable stop (not shown) can be employed to locate the slide in its back or normal position.

It is customary in machines of this character to employ a driving-shaft carrying the driving-pulley and to locate said shaft beneath the head of the machine and operate the cutter-holder from a cam on this shaft. With this arrangement there is more vibration imparted to the cutter-holder, which shakes and disarranges the fixed parts of the machine. With my present construction the usual driving-shaft is dispensed with and the upper feed-roll shaft 8 becomes the driving-shaft and the second feed-roll 7 is driven by the pinion 70, meshing with the pinion 71 on said shaft 7. Placing the cam for actuating the cutting-off lever on the upper feed-roll shaft, the cutter-holder is actuated directly in line with the cutting-off die, so that all shock or jar is entirely eliminated from the machine. It will therefore be readily seen that my present invention possesses many novel features that will be appreciated by users of machines of this character. It is cheaply constructed, readily assembled and taken down for transportation, can be extended to cut any length of wire at a very small extra cost, and when the head alone is used the driving-pulley and cutter-holder cam may be dispensed with, and the cutter-holder can be operated by means of the handle 72, shown (see Fig. 2) in broken view as projecting from a hole in the said holder.

Having thus described my invention, what I claim as new, and desire to secure by Letters Patent, is—

1. The combination, in a machine of the character described, comprising a head, a driving-shaft journaled therein, a wire-feed roll mounted thereon, a second wire-feed roll in close proximity to the wire-feed roll of the driving-shaft, said driving-shaft carrying a driving-pulley and cam, a cutter-holder reciprocally supported in close proximity to said head, a driving-pin operatively mounted in said holder and adapted to be engaged by said cam to actuate said holder to sever a section of wire, for the purpose set forth.

2. The combination, in a machine of the character described, comprising a head, a driving-shaft, carrying a wire-feed roll, journaled therein, a second wire-feed roll mounted in said head, said shaft carrying a driving-pulley and cam, a cutter-holder reciprocally supported in close proximity to said head, a driving-pin operatively mounted in said holder to be engaged by said cam to actuate said holder forward to sever a wire section, a spring to serve as a shock-arrester when the wire is being severed and also to return the holder to its normal position, means for locking the driving-pin when said holder is in its normal position, for the purpose set forth.

3. The combination, in a machine of the character described, comprising a head, a driving-shaft carrying a wire-feed roll, a cam and a driving-pulley, a second wire-feed roll journaled in a box located in said head, said box adapted to be tilted so that the second roll is carried to and from the first-named roll, a weighted lever fulcrumed in said head and in contact with said box, a cutter-holder reciprocally supported in close proximity to said head, a driving-pin operatively mounted in said holder to be engaged by said cam to actuate the holder to cut a section of wire, means on said holder to actuate the weighted lever and permit the said second wire-feed roll to temporarily drop away from the wire after a section has been severed therefrom, means for returning said cutter-holder and its driving-pin to their normal positions, for the purpose set forth.

4. The combination, in a machine of the character described, comprising a head, a reciprocating cutter-holder, a cam for actuating said holder to sever a section of wire, an adjustable stop against which said holder rests when in its normal position and to adjust the position of the cutter with respect to the cutting-die, for the purpose set forth.

5. The combination, in a machine of the character described, comprising a head, a driving-shaft journaled therein, wire-feed rolls, one of which is mounted on said shaft together with a driving-pulley and a cam, said head having a wire-cutting die, a reciprocating cutter-holder carrying a cutter, a driving-pin operatively mounted in said holder to be engaged by said cam to actuate said holder to sever a section of wire, means on said cam to carry said pin out of engagement with that portion of the cam that actuates said holder to cut the wire, a locking-bolt to retain said pin in its normal position, a trip-wire to actuate said bolt, for the purpose set forth.

6. In a machine of the character described, a cutter-holder, a driving-pin carried by said holder operatively mounted therein, a cam to engage said pin to actuate said cutter-holder, for the purpose set forth.

7. The combination, in a machine of the character described, comprising a cutter-holder carrying a driving-pin operatively mounted therein, a cam to engage said pin to actuate said holder to cut a section of wire, an adjustable stop to engage said holder when not in action, for the purpose set forth.

8. The combination, in a machine of the character described, comprising a head carrying feed-rolls and cutting-dies, a driving-shaft carrying a driving-pulley and cam, a cutter-holder carrying a cutter and a spring-actuated driving-pin, said pin engaged by the cam to actuate said holder forward to sever a section of wire, a spring to act both as a buffer for the holder in its forward movement and to return it to its normal position, a stop to limit its backward movement, a locking-bolt for said driving-pin, a trip-wire, means for connecting said wire with the locking-bolt to release the driving-pin, for the purpose set forth.

9. In a machine of the character described, a reciprocating cutter-holder, a driving-pin operatively mounted therein, a cam to engage said pin to actuate said holder to cut a section of wire, a projection on said cam to return the pin to its normal position and means for temporarily locking it in such position, for the purpose set forth.

10. The combination, in a machine of the character described, comprising a head carrying feed-rolls, one of which rolls is mounted on a shaft journaled in a movable support, a weighted lever engaging said support, a cutter-holder reciprocally supported in close proximity to said head, means on said holder to actuate said weighted lever and temporarily release one of said feed-rolls from its engagement with the wire, for the purpose set forth.

11. The combination, in a machine of the character described, comprising a head, feed-rolls mounted on shafts, one of said shafts journaled in the head, the other shaft journaled in a tilting box located in said head, a manually-operated adjusting-block to engage said box and maintain its roll in feeding engagement with the wire, for the purpose set forth.

12. The combination, in a machine of the character described, comprising a guide-bar having a longitudinal groove therein to receive the wire, a supporting-bar for said guide-bar, a support for said supporting-bar, the grooved face of said guide-bar resting on its supporting-bar, said guide-bar adapted to have a lateral sliding movement on its supporting-bar to discharge a section of wire therefrom, for the purpose set forth.

13. The combination, in a machine of the character described, comprising a guide-bar having a longitudinal groove in one of its faces, a supporting-bar, the grooved face of the guide-bar operatively resting thereon, a reciprocally-operating cutter-holder to engage and move the guide-bar laterally on its support to discharge a section of wire therefrom, for the purpose set forth.

14. The combination, in a machine of the character described, comprising a guide-bar having a longitudinal groove therein to receive the wire, a supporting-bar, the grooved face of the guide-bar resting thereon, a reciprocally-operating cutter-holder to engage and move the guide-bar laterally on its support to discharge a section of wire therefrom, means connected with said bar to maintain its parallelism with its supporting-bar throughout its entire length, for the purpose set forth.

15. The combination, in a machine of the character described, comprising a guide-bar having a longitudinal groove in one of its faces to receive the wire, a support for said bar, said grooved face resting on said support, a reciprocating cutter-holder to engage said bar to actuate it laterally on its support to discharge a section of wire, means for maintaining the parallelism of said bar with its support, means for returning said bar to its normal position, for the purpose set forth.

16. The combination, in a machine of the character described, comprising a guide-bar having a longitudinal groove in one of its faces to receive the wire, a support for said bar with said grooved face resting thereon, said bar adapted to have a lateral sliding movement on its support and parallel therewith, for the purpose set forth.

17. In a machine of the character described, a guide-bar having a longitudinal groove in one of its faces for the wire, a stationary supporting-bar on which said guide-bar is slidably mounted to move laterally, for the purpose set forth.

18. The combination, in a machine of the character described, comprising a guide-bar for the wire, a support for said bar, a reciprocating cutter-holder, adjustable means on said holder to engage said bar to actuate it laterally on its support to discharge a section of wire therefrom, means for maintaining the parallelism of said bar with its support, means for automatically returning said bar to its normal position, for the purpose set forth.

19. The combination, in a machine of the character described, comprising a guide-bar having a longitudinal groove in one of its faces to receive the wire, a support for said bar, said bar adapted to have a lateral sliding movement thereon and parallel therewith, a clamp adjustably secured to said support, an overhanging lip of said clamp embracing the upper surface of the bar to prevent its lifting from its support, for the purpose set forth.

20. The combination, in a machine of the character described, comprising a guide-bar having a longitudinal groove in one of its faces, a support for said bar, means for actuating said bar laterally on its support, links having one of their ends pivotally supported adjacent to said bar, the other ends on said bar whereby the parallelism of said bar with its support is maintained when said guide-bar is in motion, means for automatically returning the guide-bar to its normal position, for the purpose set forth.

21. The combination, in a machine of the character described, comprising a guide-bar for the wire, a stationary supporting-bar therefor, means for effecting a lateral sliding movement of the guide-bar on its supporting-bar, means for maintaining the parallelism of the guide-bar with its supporting-bar, and means for automatically returning said guide-bar to its normal position, for the purpose set forth.

22. The combination, in a machine of the character described, comprising a guide-bar for the wire, a supporting-bar therefor, wire-receiving brackets on which said supporting-bar rests, means for actuating said guide-bar laterally on its supporting-bar, links pivotally supported on said brackets and guide-bar whereby said bars are maintained in parallel alinement with each other, arms adjustably supported outside of said bars and carrying springs at their free ends to connect with the guide-bar to automatically effect the return of said bar to its normal position, for the purpose set forth.

23. The combination, in a machine of the character described, comprising a guide-bar for the wire, a supporting-bar therefor, means for actuating the guide-bar laterally on its supporting-bar, links pivotally supported adjacent to said bars and also on the guide-bars to maintain said bars in parallel relation with each other, a projection on said links adapted to engage said supporting-bar to maintain the engagement of said bars with each other, for the purpose set forth.

24. The combination, in a machine of the character described, comprising a guide-bar for the wire and a supporting-bar therefor, means for laterally actuating said guide-bar, a weighted lever pivotally supported adjacent to said guide-bar and also on the same to maintain both of said bars in parallel relation with each other and to automatically return said guide-bar to its normal position, for the purpose set forth.

25. The combination, in a machine of the character described, comprising a guide-bar and a supporting-bar therefor, means for actuating said guide-bar, a weighted lever pivotally supported adjacent to said bar and on the same to maintain both of said bars in parallel relation with each other, and to automatically return said guide-bar to its normal position, means on said lever to engage the supporting-bar to maintain said bars in contact with each other, for the purpose set forth.

26. The combination, in a machine of the character described, comprising a guide-bar having a longitudinal groove to receive the wire, a supporting-bar for said guide-bar, means for actuating said guide-bar laterally on its support, a second guide-bar and its supporting-bar in linear alinement with the first-named bars, means whereby both guide-bars move in lateral unison, means whereby all of said bars are maintained in parallel relation with each other, means for returning both guide-bars to their normal position, for the purpose set forth.

27. The combination, in a machine of the character described, comprising a guide-bar having a longitudinal groove to receive the wire, a supporting-bar for said guide-bar, a cutter-holder carrying a cutter, a driving-pin operatively mounted in said holder, a cam to actuate said holder through the medium of said driving-pin, a stop-rod located in the guide-bar groove, a trip-wire connected with said rod and adapted to release the driving-pin and bring it into engagement with the cam, means on said holder to engage with and actuate the guide-bar laterally on its supporting-bar to discharge a section of wire therefrom, for the purpose set forth.

28. The combination, in a machine of the character described, comprising a head having a cutting-die, a driving-shaft journaled in said head, feed-rolls, one of which rolls is mounted on said shaft, said shaft also carrying a driving-pulley and cam, a reciprocating cutter-holder carrying a cutter, a driving-pin operatively mounted in said holder, a guide-bar for the wire, a supporting-bar for said guide-bar, means on the holder to engage the guide-bar, means for locking the driving-pin in its normal or retreated position, means for releasing said pin to bring it in contact with the cam and by such contact to actuate the cutter-holder to sever a section of wire, and, by means of the engagement of said holder with the guide-bar, said bar is moved laterally on its support to discharge such severed sections, means for maintaining said bars in parallel relation with each other, and means for automatically returning the guide-bar to its normal position, for the purpose set forth.

29. The combination, in a machine of the character described, comprising duplicate guide-bars having longitudinal grooves to receive the wire, said bars operatively connected together, an independent supporting-bar for each of said guide-bars, means for actuating said bars on their supports, means for maintaining said guide-bars in parallel relation with their supporting-bars and in linear alinement with each other, and means for returning the guide-bars to their normal position.

30. The combination, in a machine of the character described, comprising feed-rolls having a plurality of circumferential grooves, a support for said rolls, a side wall, packing, substantially the thickness of one of said grooves interposed between said side wall and rolls to bring the first groove of the rolls in line with the wire, the second groove of the rolls being adapted to be brought in line with the wire by the removal of said packing, said rolls adapted to be reversed, for the purpose set forth.

Signed at Bridgeport, in the county of Fairfield and State of Connecticut, this 18th day of November, A. D. 1903.

FRANKLIN B. SHUSTER.

Witnesses:
G. DROUVÉ,
GEORGE W. FINN.